Aug. 9, 1966  J. F. KAHLENBERG  3,265,487

AMPUL SEALING APPARATUS

Filed May 23, 1963

James F. Kahlenberg
INVENTOR.

BY
ATTORNEY

United States Patent Office 3,265,487
Patented August 9, 1966

3,265,487
AMPUL SEALING APPARATUS
James F. Kahlenberg, P.O. Box 3636, Sarasota, Fla.
Filed May 23, 1963, Ser. No. 282,618
8 Claims. (Cl. 65—270)

This invention relates to means for and method of sealing glass ampuls as used in the distribution of a wide variety of materials, particularly pharmaceutical materials such as medication, drugs, semen and the like.

It is, of course, recognized that large elaborate, complicated and expensive sealing equipment has been developed for the automatic successive sealing of ampuls by continuous automatic operation. The present applicant is among those who have contributed to the development and progress of this field as witnessed by his prior patents. It is my object with the present invention to provide a small, lightweight, inexpensive, manually operable device to fulfill a recognized economic need for rapidly and efficiently sealing individual ampuls. Another object of the invention is to provide an apparatus of the type set forth in which there is minimum danger of deterioration of the ampul contents as a result of the sealing operation. Since glass is relatively non-heat conductive, localized application of heat at the seal area in the neck of the ampul, the glass below the seal area will remain at room temperature; however, at fusing temperatures the area to be sealed becomes illuminous, thus propagating radiant heat which may have a dilatorious effect on sensitive materials within the ampul. Thus it is among the objects of the present invention to provide an apparatus by which the luminous bead produced by the heat fusion by the neck of the ampul is of miniature dimensions, as for instance, substantially less than the diameter of the neck of the ampul. Such luminous beads formed by many present day sealing devices equal or exceed such diameter. Since the radiant heat emitted by the luminous bead is determined by the volume of the bead and varies directly with the cube of its radius, it follows that doubling the radius of the bead increases the radiant energy emitted by eight times. Another object we mentioned is provided by the device we described, in which the ampul is automatically rotated as the neck is fused and drawn from the ampul body. Other objectives of the present invention provide simplicity of construction, ease of manipulation and durability, insuring a long life of operability and providing for economy of manufacture. Numerous other objects, features and advantages of the present invention will be apparent from a consideration of the following specification taken in conjunction with the accompanying drawings, in which, FIG. 1 is a top view of one preferred embodiment of the present invention showing the sealing carriage in successive positions by dotted lines.

In general terms the present preferred structural embodiment of the inventive concept may be characterized as including a base plate for appropriate securement upon a suitable surface to constitute a bench type apparatus. At one side of the base there is provided a carriage support-guide rail upon which a manually manipulatable reciprocable ampul holding carriage is mounted. Parallel rollers are mounted on the carriage between which an unsealed ampul may be inserted. A spring urged rubber or rubber faced pad, arranged along the path of travel of the ampul with the carriage rotates the ampul as it is moved by the carriage. A burner mounted on the carriage melts a localized portion of the ampul neck as the ampul is moved and rotated. Neck gripping fingers are also provided on the carriage together with means by which the fingers are elevated to stretch the neck during rotation. The device thus may operate to form a twisted-drawn seal; however, simple fused tip seals may be produced by the present apparatus. At the end of travel, the seal is separated from the ampul body and the ampul is discharged into a discharge channel while the carriage is moved to discard the disassociated neck.

Repetitious action by manual control results in efficient sealing of the ampuls and discard of the severed necks. It will, of course, be understood that the detailed structure features hereinafter set forth are presented by way of illustration and that the inventive concept is not limited to the specific details here shown and that in the practice of the invention numerous changes, modifications and the full use of equivalents may be reverted to without departure from the primary concept.

Figure 4:
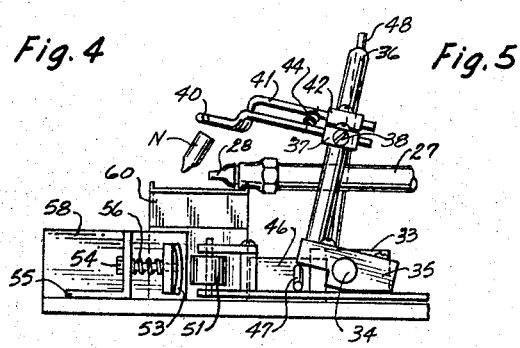
FIG. 4 is a fragmentary side elevation illustrating the position of parts as the neck is discharged.
Figure 5:
FIG. 5 is a side elevation of an ampul after sealing and with tip removed by the present apparatus.

FIGURE 4 is a side elevation of an ampul of the type herein referred to.

Figure 1:
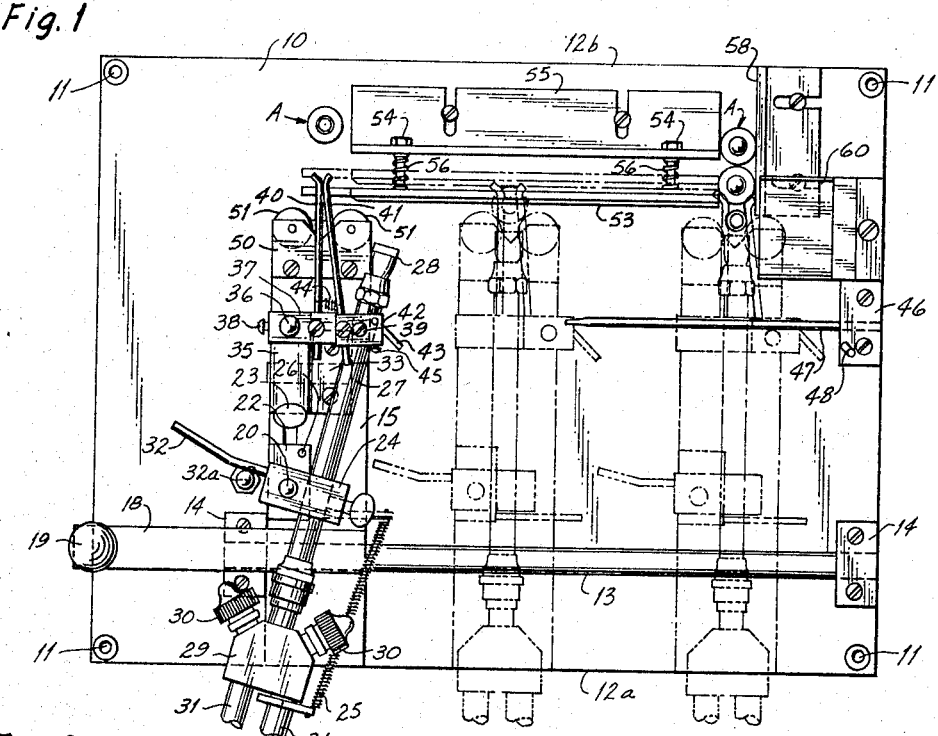
Figure 2:
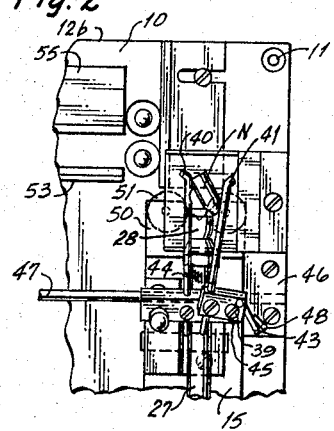
FIG. 2 is a fragmentary detail view illustrating the position of the carriage as the ampul neck is discharged.
Figure 3:
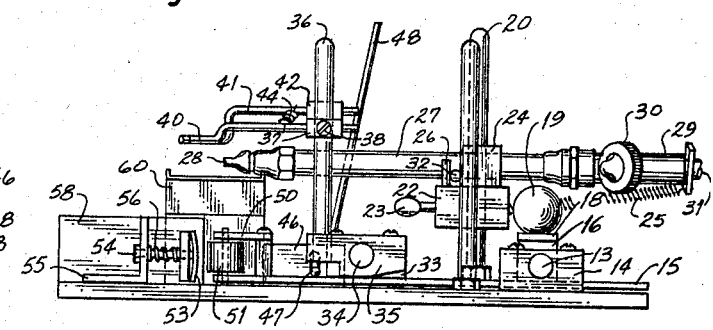
FIG. 3 is a side elevation of the present invention as shown in FIGURE 1.

Referring now to the drawings, it will be seen that the numeral 10 designates a rectangular base plate of rigid, durable, preferably metallic material of such thicknesses as may be desired to provide an ample rigid support. At the corners of the plate 10 apertures 11 are provided to receive appropriate securing means for mounting the plate on a table or bench. An appropriate disposition of the device for rapid and efficient operation is with one longitudinal edge normally at the operator's right here shown as the edge 12A, nearest the carriage guiding and supporting slide 13. For convenience of description this is indicated as the right edge. The opposite or left edge is indicated by the numeral 12B. The slide rod 13 is mounted in longitudinally spaced securing blocks 14 by which the slide rod 13 is rigidly maintained in vertical spaced relation longitudinally to the base 10 adjacent the edge 12A. The slide rod 13 is here depicted as an elongate cylindrical member constituting a supporting guideway for the carriage 15, which is mounted on rod 13 by a slidably mounted bearing block 16 apertured to receive the rod 13. From the top of the bearing block 16 a laterally extending handle arm 18 is provided extending outwardly parallel to the edge 12A. For convenience of description the term "outer" refers to a direction towards the left of the devices as shown in FIGURE 1, while "inner" refers to the opposite direction or to the right in FIGURE 2. On the outer extremity of the handle arm 18 a manually manipulatable knob 19 is provided. Thus the carriage may be readily reciprocated under manual control to and fro on the slide rod 13.

Mounted on the carriage 15 just forwardly of the bearing block 16 there is provided a vertical burner supporting post 20, upon which is mounted a vertically adjustable stop block 22 securable in vertically adjustable position by a thumbscrew 23. It will be understood that the post 20 and block 22, when in adjusted position, are rigid with respect to the carriage 15. Over the block 22 there is pivotally mounted on the post 20, a burner supporting clamp 24, which is normally biased by a spring 25 towards counterclockwise movement. A vertical stop pin 26 on the stop block 22 limits such counterclockwise movement so the flame centers on the neck of the ampul. The burner clamp 24 receives therethrough a hollow cylindrical burner tube 27, the outer end of which is provided with a burner nozzle 28, which during the travel of the carriage is directed toward the ampul neck, while the burner tube is parallel with the longitudinal axis of the carriage. At the outer end of the burner tube a gas and oxygen control and mixing element 29 is provided, the emission of gasses being under the control of manipulatable valves 30 while such gasses are supplied through tubes 31.

Extending outwardly towards the left, as in FIGURE 1, the burner clamp 24 is provided with a forwardly inclined burner turn bar 32. The base 10 is provided with a vertically extending burner turn post 32a, which intercepts the path of travel of the bar 32 in the furthermost outward or ampul loading position at the left of FIGURE 1. Thus the burner 27 with its clamp 24 is rocked in clockwise rotation against the biasing of the spring 25 to move the flame away from its normal registration with an ampul neck when the ampul is inserted prior to movement by the carriage in the manner hereinafter set forth. As the carriage is moved to the right from the loading position indicated by the full lines of FIGURE 1, the bar will be withdrawn from contact with post 32a to permit the burner tube 27 to move under tension of spring 25 to resume a position with the flame from the nozzle in registration with the ampul neck.

Mounted on the carriage 15 forwardly of the post 20 a mounting block 33 is provided from which projects to the left a laterally extending pivot pin 34. On the pin 34 there is rockably mounted a pivot block 35 supporting an upwardly extending tip remover post 36 on which is adjustably mounted a fixed tip remover arm 37 arranged for selective longitudinal adjustment on the bar 36 by a screw 38. From the arm 37 there extends a fixed tip jaw 40 containing a serration for receiving the ampul neck which acts with a companion movable jaw 41 mounted on a pivoted jaw block 42, pivoted by a screw 39 on the block 42. The block 42 is provided with a laterally extending tip discarding arm 43 by which the jaws may be spread to release an ampul tip normally held between the fingers or jaws by the action of a spring 44 extending between the jaws to bias them towards one another. In the preferred form of the device here shown, set screws 45 are provided to permit adjustable securement of blocks, jaws and rods in preferred positions.

On the right hand edge of the base 10, as shown in FIGURE 1, a cam carrier 46 is secured, which carrier includes an inwardly projecting, vertically inclined, jaw tilting rod 47. The outer end of the rod 47 turns downwardly towards the plane of the upper surface of the base 10. This arrangement is such that as the carriage moves to the right, as in FIGURE 1, the rod 47 projects under the forward edge of the pivot block 35, thus automatically tilting the front edge of the block upwardly and thus tilting upwardly the outer ends of the jaws 40 and 41 in unison, by which they lift upwardly the molten neck portion during the terminal right-hand movement of the carriage. The cam carrier 46 also mounts a vertically extending tip discard post 48, which engages the tip discard arm 43 at the final right-hand movement of the carriage. Such engagement rocks the pivoted jaw block 42, thereby separating the jaws 40 and 41 against the tension of the spring 45 to release the ampul tip after separation from the ampul body.

At the extreme forward end of the carriage base 15 a roller mounting journal assembly 50 is secured, in which a transversely spaced pair of vertically arranged ampul receiving rollers 51 are mounted. Inwardly facing toward the outer faces of the rollers 51 there is provided on the base 10 a spring urged rubber or rubber faced friction plate 53. It will be noted at the left-hand side of FIGURE 1, where the mechanism is shown in full lines, that the extreme left-hand portion of the carriage moves the rollers to the left from the left end of the friction plate. The plate 53 is supported on pins 54 mounted through an angle bracket 55. Springs 56 provide for the yieldable urgings of the friction plate toward the plane of the rollers. By this arrangement, it will be seen that an ampul, generally indicated by the letter A, may be placed with its body B against the rollers and with its neck N inserted between the jaws 40 and 41. After such insertion, the movement of the carriage towards the right, as in FIGURE 1, engages the outer face of the body B and the ampul A against the friction plate 53, whereby the left to right movement of the carriage will cause the ampul to be rotated as it is moved toward the right in FIGURE 1. It will, of course, be understood that during such rotation the burner will subject the neck to fusing heat to seal the ampul. It will be noted that during the application of the ampul to the rollers when the carriage is at the extreme left, the burner will be moved aside by action of the turn bar 32 contacting the camming turn post 32a.

The friction plate and its bracket terminate a substantial distance inwardly from the right-hand end of the base 10. Spaced to the right of the terminal end of the friction plate and its bracket, a distance commensurate with the external diameter of the ampul body B, there is mounted a vertically extending barrier plate 58 which intercepts the sealed ampul and with the ends of the friction plate and its bracket defines an alleyway by which successive ampuls urge preceding ampuls outwardly towards the longitudinal edge of the base for discharge. From the plane of the barrier 58 and inwardly thereof there is provided an inclined chute 60 which receives the discarded necks of the ampuls as they are released by the jaws through pivotal movement of the jaw 41.

In the operation of the present device with the base plate 10 secured on a suitable support this bench model may be put into operation by manually manipulating the carriage 15 to the extreme left. In such left position as indicated by the full lines position FIGURE 1, the carriage extends to the right beyond the friction plate 53 and its bracket 55. In such position the rollers 51 are exposed without interference from the friction plate or bracket so as to facilitate the disposition of the body B of an ampul A in a vertical position therebetween. It will be noted that in this position, the burner nozzle 28 has been engaged by the burner turn post 32a to rock the burner in counter clock-wise direction against the tension of the spring 25 to dispose the nozzle to the right so the flame is out of alignment with the ampul neck N.

Such disposition of the ampul by manual insertion against the rollers may be accomplished with jaws 40 and 41 elevated if desired. However, the spring mounting of the jaw 41 permits thrust of the neck N against the tension of spring to engage the neck. The carriage is then moved to the right by manual manipulation of the knob 19 whereupon the walls of the body of the ampul engaged the outer front face of the friction plate 53 to produce frictional contact and hence a rotation of the ampul as it is moved towards the left. In such movement the burner turn bar 32 is moved out of contact with the burner turn post 32a, thus permitting the spring to return the burner tube to longitudinal alignment with the carriage 15 with the flame from the nozzle directed towards the neck end of the ampul. It will, of course, be understood that the burner may be supplied by bottled propane and oxygen gas from the tubes 31 and that the tiny gas-oxygen flame concentrates the heat at the exact location of the seal. The concentrated small flame minimizes heat dissipated and the room temperature is not affected nor is the temperature of the ampul body elevated since the glass is of poor heat conducting characteristics.

As the carriage continues its movement to the right in FIGURE 1 towards the end of the ampul contact with the friction plate 53, the actuating rod engages under the block pivot 35, its entry being depicted by the intermediate dotted line position of the carriage in FIGURE 1. Further progress of the carriage tilts the block upwardly whereby the jaws 41 and 42 move upwardly in unison to stretch the molten neck of the ampul as the ampul is continuously rotated. This forms a seal the incandescent radiant heat producing area of which is substantially less than the diameter of the neck in its original form. Thus a minimum of radiant heat is generated and hence the material of the ampul is no dilatoriously affected. A continuation of such elevation of the jaws severs the tip from the sealed and outwardly spun neck. A further continuation of the right hand movement brings the ampul to the barrier 58 where it is released from contact with the friction plate 53 and hence is urged into the channel between the barrier 58 and the end of the friction plate bracket 55. Successive ampuls will cause discharge of the sealed ampuls through the channel. The terminal movement of the carriage after release of the ampul brings the jaws, while in elevated position, carrying the severed tip to the right over the inclined chute 60. At this point of travel, the tip discarding arm 43 is engaged by the tip discard post 48 to swing the movable jaw 41 away from the fixed jaw 40 thus to release the tip to slide down the chute.

Thus it will be seen that by a subsequent manual retraction of the carriage to the left the operation may be repeated by movement of the carriage to the right whereby the ampuls will be automatically sealed during rotation, the tip being spun and severed automatically with such a movement and the sealed ampul being discharged while the tip is being released for discharge down the chute. Thus it will be seen that the present device provides a novel, simpler, efficient and economical bench type apparatus for the automatic manually controlled sealing of successive ampuls with a minimum of manipulation and with a high degree of efficiency and with minimum risk of damage to the contents of the ampul. It will, of course, be understood that in the practice of the invention, numerous changes, modifications and equivalents may be resorted to without departure from the spirit or scope of the invention as outlined in the appended claims.

What I claim is:

1. A sealing device for necked ampules including a base, an ampul receiving carriage manually movable over said base, means on said carriage for receiving an ampul for bodily movement with said carriage and for rotatable movement during such bodily movements, fixed frictional means in the path of the bodily movement of the ampules by said carriage to engage the ampul to induce rotary movement thereof during bodily movement, means on said carriage for continuously applying a fusing heat to the neck of an ampul as it is bodily moved and rotated, and pivotally movable ampul neck engaging jaws mounted on said carriage for movement therewith and fixed against rotation with respect to the rotation of the ampul.

2. A sealing device for necked ampules including a base, an ampul receiving carriage manually movable over said base, means on said carriage for receiving an ampul for bodily movement with said carriage and for rotatable movement during such bodily movements, fixed frictional means in the path of the bodily movement of the ampules by said carriage to engage the ampul to induce rotary movement thereof during its bodily movement, a gas burner secured to said carriage for continuously applying a fusing heat to the neck of an ampul as it is bodily moved and rotated, and pivotally movable ampul neck engaging jaws mounted on said carriage for movement therewith and fixed against rotation with respect to the rotation of the ampul, together with stationary cam means on said base for pivotally moving said jaws as an incident to the movement of said carriage.

3. The apparatus as set forth in claim 2 in which the path of travel of the carriage is rectilinear, the frictional means is a flat spring urged plate and the stationary cam means pivots the jaws at the terminal movement of the carriage.

4. A manually actuated, automatically operable heat sealing apparatus for the necks of glass ampules, including a base, a manually movable carriage mounted on said base, rollers on said carriage to rotatably receive an ampul therebetween and to bodily move the ampul with the movements of the carriage, a spring urged friction plate yieldably mounted on said base in the path of travel of an ampul mounted between said rollers to induce rotary movement of the ampul as it is moved by said carriage, a burner including a burner tip mounted on said carriage for movement therewith and adapted to be directed toward the neck of an ampul moved by said carriage after an ampul is inserted between said rollers, a pair of relatively movable spring urged ampul neck engaging jaws pivotally mounted on said carriage for movement therewith and for pivoted movement in unison with respect thereto said jaws being fixed with respect to the rotation of an ampul during bodily movement by said carriage.

5. A manually actuated, automatically operable heat sealing apparatus for the necks of glass ampules, including a base, a manually movable reciprocable carriage mounted on said base, a pair of spaced vertical rollers on said carriage to rotatably receive an ampul therebetween and to bodily move the ampul with the movements of the carriage, a spring urged friction plate yieldably mounted in a vertical plane on said base in the path of travel of an ampul mounted between said rollers to induce rotary movement of the ampul as it is moved by said carriage, a burner pivotally mounted on said carriage, said burner including a burner tip adapted to be directed toward the neck of an ampul as the carriage is moved after an ampul is inserted between said rollers, cam means for moving said tip from a direction toward said neck when the carriage is in position to receive an ampul, a pair of ampul neck engaging jaws pivotally mounted on said carriage for movement therewith and for pivotal movement in unison with respect thereto.

6. A manually actuated, automatically operable heat sealing apparatus for the necks of glass ampules, including a base, a manually movable reciprocable carriage mounted on said base, a pair of spaced vertical rollers on said carriage to rotatably receive an ampul therebetween and to bodily move the ampul with the movements of the carriage, a spring urged friction plate yieldably mounted in a vertical plane on said base in the path of travel of an ampul mounted between said rollers to induce rotary movement of the ampul as it is moved by said carriage, a burner pivotally mounted on said carriage said burner including a burner tip adapted to be directed toward the neck of an ampul as the carriage is moved after an ampul is inserted between the rollers, a pair of relatively movable neck engaging jaws pivotally mounted on said carriage for movement therewith and for pivotal movement in unison with respect thereto, and fixed cam means on said base for pivotally moving said jaws in unison.

7. A manually actuated, automatically operable heat sealing apparatus for the necks of glass ampules, including a base a manually movable reciprocatable carriage mounted on said base, a pair of spaced vertical rollers on said carriage to rotatably receive an ampul therebetween and to bodily move the ampul with the movements of the carriage, a spring urged friction plate yieldably mounted in a vertical plane on said base in the path of travel of an ampul mounted between said rollers to induce rotary movement of the ampul as it is moved by said carriage, a burner pivotally mounted on said carriage said burner including a burner tip adapted to be directed toward the neck of an ampul as the carriage is moved after an ampul is inserted between said rollers, cam means for moving said tip from the direction toward said neck when the carriage is in position to receive an ampul, a pair of relatively movable spring urged ampul neck engaging jaws pivotally mounted on said carriage for movement therewith and for pivotal movement in unison with respect thereto said jaws being fixed with respect to the rotation of an ampul during bodily movement.

8. A manually actuated, automatically operable heat sealing apparatus for the necks of glass ampules, including a base, a manually movable reciprocatable carriage mounted on said base, a pair of spaced vertical rollers on said carriage to rotatably receive an ampul therebetween and to bodily move the ampul with the movements of the carriage, a spring urged friction plate yieldably mounted in a vertical plane on said base in the path of travel of an ampul mounted between said rollers to induce rotary movement of the ampul as it is moved by said carriage, a burner pivotally mounted on said carriage said burner including a burner tip adapted to be directed toward the neck of an ampul as the carriage is moved after an ampul is inserted, between said rollers, cam means for moving said tip from the direction toward said neck when the carriage is in position to receive an ampul, a pair of relatively movable spring urged ampul neck engaging jaws pivotally mounted on said carriage for movement therewith and for pivoted movement in unison with respect thereto, said jaws being fixed with respect to the rotation of an ampul during bodily movement by said carriage, and individual fixed cam means on said base for successively pivotally moving said jaws in unison and thereafter moving said jaws with respect to each other to release an ampul neck.

References Cited by the Examiner

UNITED STATES PATENTS

| | | | |
|---|---|---|---|
| 1,631,379 | 6/1927 | Maurer | 65—270 |
| 2,212,842 | 8/1940 | McGowan | 65—269 X |
| 3,124,445 | 3/1964 | Tatibana | 65—105 X |

FOREIGN PATENTS

| | | |
|---|---|---|
| 368,907 | 2/1923 | Germany. |

DONALL H. SYLVESTER, *Primary Examiner.*

A. D. KELLOGG, *Assistant Examiner.*